(12) United States Patent
Su et al.

(10) Patent No.: US 12,230,846 B2
(45) Date of Patent: Feb. 18, 2025

(54) BATTERY CABINET

(71) Applicant: CONTEMPORARY AMPEREX TECHNOLOGY (HONG KONG) LIMITED, Hong Kong (CN)

(72) Inventors: Haibin Su, Ningde (CN); Hua Zhang, Ningde (CN); Haoran Peng, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 142 days.

(21) Appl. No.: 18/086,447

(22) Filed: Dec. 21, 2022

(65) Prior Publication Data
US 2023/0125110 A1   Apr. 27, 2023

Related U.S. Application Data

(63) Continuation of application No. PCT/CN2022/082755, filed on Mar. 24, 2022.

(30) Foreign Application Priority Data

Apr. 1, 2021   (CN) .......................... 202120672417.8

(51) Int. Cl.
*H01M 50/691* (2021.01)

(52) U.S. Cl.
CPC .................. *H01M 50/691* (2021.01)

(58) Field of Classification Search
CPC ... H01M 50/691; H01M 50/24; H01M 50/251
See application file for complete search history.

(56) References Cited

U.S. PATENT DOCUMENTS

| 1,093,706 A | * | 4/1914 | Laubach | ................. F16K 15/06 137/332 |
| 2,069,297 A | * | 2/1937 | Abercrombie | .......... F16K 15/06 137/902 |

(Continued)

FOREIGN PATENT DOCUMENTS

| CN | 201753789 U | 3/2011 |
| CN | 203172417 U | 9/2013 |

(Continued)

OTHER PUBLICATIONS

IP Australia Examination report No. 1 for Application No. 2022231801 Sep. 19, 2023 7 pages.

(Continued)

*Primary Examiner* — Umashankar Venkatesan
(74) *Attorney, Agent, or Firm* — ANOVA LAW GROUP, PLLC (57) ABSTRACT

This application discloses a battery cabinet. A drain assembly is disposed at the bottom of a cabinet body of the battery cabinet. The drain assembly includes a drain valve. A valve spool and a magnetic object are disposed in the drain valve. The valve spool is movably disposed in the drain valve and has a first state of sealing the drain valve or a second state of opening the drain valve. The magnetic object generates a magnetic force to keep the valve spool in the first state, and the valve spool stays in the second state when a downward force applied to the valve spool is greater than a preset value. Therefore, draining is started when the water accumulated on the valve spool reaches a specified weight, and a new valve spool is automatically closed after the water is drained.

20 Claims, 5 Drawing Sheets

(56) References Cited

U.S. PATENT DOCUMENTS

| | | | | |
|---|---|---|---|---|
| 2,525,799 | A | * | 10/1950 | Hecker .................. F16K 15/06 251/363 |
| 2,927,767 | A | * | 3/1960 | Ray .......................... F16K 1/42 251/210 |
| 5,579,815 | A | | 12/1996 | Labonte |
| 5,997,049 | A | * | 12/1999 | Kingsford ............. F16L 15/008 29/525 |
| 11,165,102 | B2 | * | 11/2021 | Ogawa ................ H01M 10/345 |
| 11,183,728 | B2 | * | 11/2021 | Shimazaki .......... H01M 50/224 |
| 11,519,510 | B1 | * | 12/2022 | Otaibi ..................... F16K 15/06 |
| 11,857,761 | B2 | * | 1/2024 | Thakore ................... B08B 1/20 |
| 2007/0044846 | A1 | * | 3/2007 | Ashurst ................. F16K 15/023 137/533.13 |
| 2017/0343124 | A1 | * | 11/2017 | Zimmer ................ F16K 15/141 |
| 2020/0308818 | A1 | | 10/2020 | Chen et al. |
| 2022/0369481 | A1 | * | 11/2022 | Yano ...................... B01D 69/10 |
| 2023/0095593 | A1 | * | 3/2023 | Meng ................. H01M 50/251 361/691 |
| 2023/0344067 | A1 | * | 10/2023 | Liu ..................... H01M 50/251 |
| 2023/0420794 | A1 | * | 12/2023 | Liu ..................... H01M 50/317 |
| 2024/0142018 | A1 | * | 5/2024 | Denoth ................. F16K 31/084 |

FOREIGN PATENT DOCUMENTS

| | | |
|---|---|---|
| CN | 206364077 U | 7/2017 |
| CN | 107237393 A | 10/2017 |
| CN | 206864570 U | 1/2018 |
| CN | 207048019 U | 2/2018 |
| CN | 207295936 U | 5/2018 |
| CN | 214754007 U | 11/2021 |
| KR | 20200113555 A | 10/2020 |

OTHER PUBLICATIONS

The China National Intellectual Property Administration (CNIPA) Notice of Grant of Utility Model Patent Right for Application No. 202120672417.8 Oct. 11, 2021 2 pages (including translation).
The European Patent Office (EPO) The Extended European Search Report for Application No. 22778736.3 Feb. 14, 2024 5 Pages.
IP Australia Examination report No. 2 for Application No. 2022231801 Dec. 11, 2023 4 pages.
IP Australia Examination report No. 3 for Application No. 2022231801 Mar. 21, 2024 4 pages.
International Search Report and Written Opinion, PCT/CN2022/082755, May 26, 2022, 12 pgs.

* cited by examiner

BATTERY CABINET

CROSS-REFERENCE TO RELATED APPLICATIONS

This application is a continuation application of PCT Patent Application No. PCT/CN2022/082755, entitled "BATTERY CABINET" filed on Mar. 24, 2022, which claims priority to Chinese Patent Application No. 202120672417.8, filed with the State Intellectual Property Office of the People's Republic of China on Apr. 1, 2021, and entitled "BATTERY CABINET", all of which are incorporated herein by reference in their entirety.

TECHNICAL FIELD

This application relates to the technical field of energy storage devices, and in particular, to a battery cabinet for energy storage.

BACKGROUND

Battery cells are disposed in a battery cabinet. In order to prevent external moisture from entering the battery cabinet and damaging the battery cells, the battery cabinet is required to have a high waterproof level. Moreover, condensed water is produced during use of the battery cabinet, and the produced condensed water is deposited at the bottom of the battery cabinet. How to drain the condensed water out of the battery cabinet while preventing external moisture from entering the inside of the battery cabinet is a technical issue that technicians urgently need to address.

Existing battery cabinet draining methods cannot drain condensed water in the cabinet body while meeting the cabinet body protection level. In addition, existing battery cabinet drain assemblies have a complex structure, which is inconvenient for disassembly and maintenance. Sealing elements in the drain assembly are failure-prone, which affects the sealing effect.

SUMMARY

In view of this, it is necessary to provide a battery cabinet to solve the technical problems of insufficient waterproof level and inconvenient disassembly and maintenance of existing battery cabinets.

To achieve the foregoing objective, this application provides a battery cabinet, including:

a cabinet body, where the cabinet body is configured to accommodate battery cells; and a drain assembly, where the drain assembly is disposed in a drain outlet at the bottom of the cabinet body, the drain assembly includes a drain valve, a base, and a first seal ring, the drain valve communicates with the drain outlet and is detachably mounted on the base, the drain valve is hermetically connected to an upper surface of the base via the first seal ring, the base is fixedly connected to the bottom of the cabinet body, a first boss is disposed on the upper surface of the base, and the first boss is configured to protect the first seal ring.

Further, the first boss is provided in plurality on the upper surface of the base, and the plurality of first bosses are uniformly distributed around the drain valve in a circumferential direction of the drain valve.

Further, the drain assembly further includes a cover plate and a second seal ring; and the top of the drain valve overlaps with the edge of the drain outlet, the cover plate abuts against the top of the drain valve, and the cover plate and the top of the drain valve are hermetically connected via the second seal ring.

Further, the drain valve includes a valve spool assembly and a drain valve casing, the valve spool assembly is disposed in the drain valve casing, the drain valve casing is a cylindrical structure, the top of the cylindrical structure is provided with a folded-out flange, and the flange overlaps with the edge of the drain outlet.

Further, height of the first boss is less than the sum of thickness of the flange, original thickness of the first seal ring, and original thickness of the second seal ring.

Further, the drain valve and the base are detachably connected via a bolt; and an upper end surface of the first boss is provided with a threaded hole that fits with the bolt, and a tail end of the bolt runs through the cover plate and is connected to the threaded hole, so that the cover plate, the second seal ring, the drain valve, the first seal ring, and the base are connected.

Further, the first seal ring has an O-shaped cross section, and the second seal ring has a rectangular cross section.

Further, a second boss is further disposed at the edge of the upper surface of the base, the first bosses are arranged around the drain valve, and the first seal ring is located within a range surrounded by the first bosses.

Further, the cabinet body includes a bottom plate and side plates, and the bottom plate is located at the bottom of the cabinet body; and the bottom plate is provided with the drain outlet, the bottom plate further has a conical diverting structure, the drain outlet is disposed in the middle of the conical diverting structure, and in a direction along the periphery of the conical diverting structure toward the middle of the conical diverting structure, the conical diverting structure has a decreasing height, so that water is diverted to the drain outlet.

Further, the drain valve includes a valve spool and a guide rod; and the valve spool movably fits around the guide rod, the guide rod is provided with a magnetic object, the magnetic object generates a magnetic force to drive the valve spool to close the drain valve, and the drain valve is opened when a downward force applied to the valve spool is greater than a preset value.

Different from the prior art, the battery cabinet in the foregoing technical solution includes the cabinet body and the drain assembly, where the drain assembly is disposed at the bottom of the cabinet body, the drain assembly includes the drain valve and the base, the base is fixedly connected to the bottom of the cabinet body, the drain valve is detachably mounted on the base, the upper surface of the base is provided with two or more first bosses, the first bosses protrude from the upper surface of the base in height, the drain valve is hermetically connected to the upper surface of the base via the first seal ring, and the drain valve and the base are detachably connected via the bolt. In this way, the drain valve is easy to disassemble and maintain; and the first bosses with the height can prevent the first seal ring from being crushed while achieving a good sealing effect.

Further, the drain valve is a magnetic drain valve. When the downward force applied to the valve spool is greater than an upward magnetic force generated by the magnetic object, the valve spool is in an open state, so that draining is started when water accumulated on the valve spool and pressure produced inside the battery cabinet reach a specified weight. The valve spool is automatically closed after water is drained. Compared with a return trap or spring drain structure in existing battery cabinets, the battery cabinet of this application uses the magnetic force to control the valve spool to implement one-way draining while allowing the valve spool to operate more reliably. Similarly, in the case of an accident such as thermal runaway inside the cabinet, after air pressure inside the cabinet body reaches a specified value, the valve spool is also automatically opened to relieve the pressure.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

In the accompanying drawings, the figures are not drawn to scale.

Reference signs: 1. cabinet body; 11. bottom plate; 110. drain outlet; 111. conical diverting structure; 2. drain assembly; 21. drain valve; 211. drain valve casing; 212. valve spool; 213. guide rod; 22. base; 23. cover plate; 24. second seal ring; 25. first seal ring; 26. bolt; 221, first boss; and 222. second boss.

DESCRIPTION OF EMBODIMENTS

In order to describe in detail the technical content, structural features, achieved objectives and effects of the technical solution, the following describes in detail in conjunction with embodiments and accompanying drawings.

In the descriptions of this application, it should be noted that, unless otherwise stated, "plurality" means two or more; and the orientations or positional relationships indicated by the terms "upper", "lower", "left", "right", "inside", "outside", and the like are merely intended to help the descriptions of this application and simplify the descriptions other than indicate or imply that the apparatuses or components must have specific orientations, or be constructed and manipulated with specific orientations, and therefore shall not be construed as limitations on this application. In addition, the terms "first", "second", and "third" are merely intended for a purpose of description, and shall not be understood as an indication or implication of relative importance. "Vertical" means being vertical with an allowable range of error other than being strictly vertical. "Parallel" means being parallel with an allowable range of error other than being strictly parallel.

The orientation terms appearing in the following description all are directions shown in the figures, and do not limit the specific structure of the application. In the descriptions of this application, it should be further noted that unless otherwise specified and defined explicitly, the terms "installment", "link", and "connection" should be understood in their general senses. For example, the terms may be a fixed connection, a detachable connection, or an integrated connection, or may be a direct connection, or an indirect connection through an intermediate medium. A person of ordinary skill in the art can understand specific meanings of these terms in this application based on specific situations.

In this application, "a plurality of" means more than two (inclusive).

Referring to FIG. 1 to FIG. 6, embodiments of this application provide a battery cabinet. The battery cabinet includes a cabinet body 1 and a drain assembly 2. The cabinet body 1 is configured to accommodate battery cells. The drain assembly 2 includes a base 22 and a drain valve 21 detachably disposed on the base 22, and the drain valve 21 communicates with a drain outlet 110, thereby facilitating mounting and daily disassembly and maintenance of the drain assembly 2. A first boss 221 that protrudes upward is disposed on an upper surface of the base 22. The first boss 221 is configured to protect a first seal ring 25. The first boss 221 with a height gives the upper surface of the base 22 a space for arranging the seal ring, so that the first seal ring 25 and a second seal ring 24 on the upper surface of the base 22 can be prevented from being crushed, allowing condensed water to be drained in time while ensuring airtightness of the battery cabinet.

Figure 1:
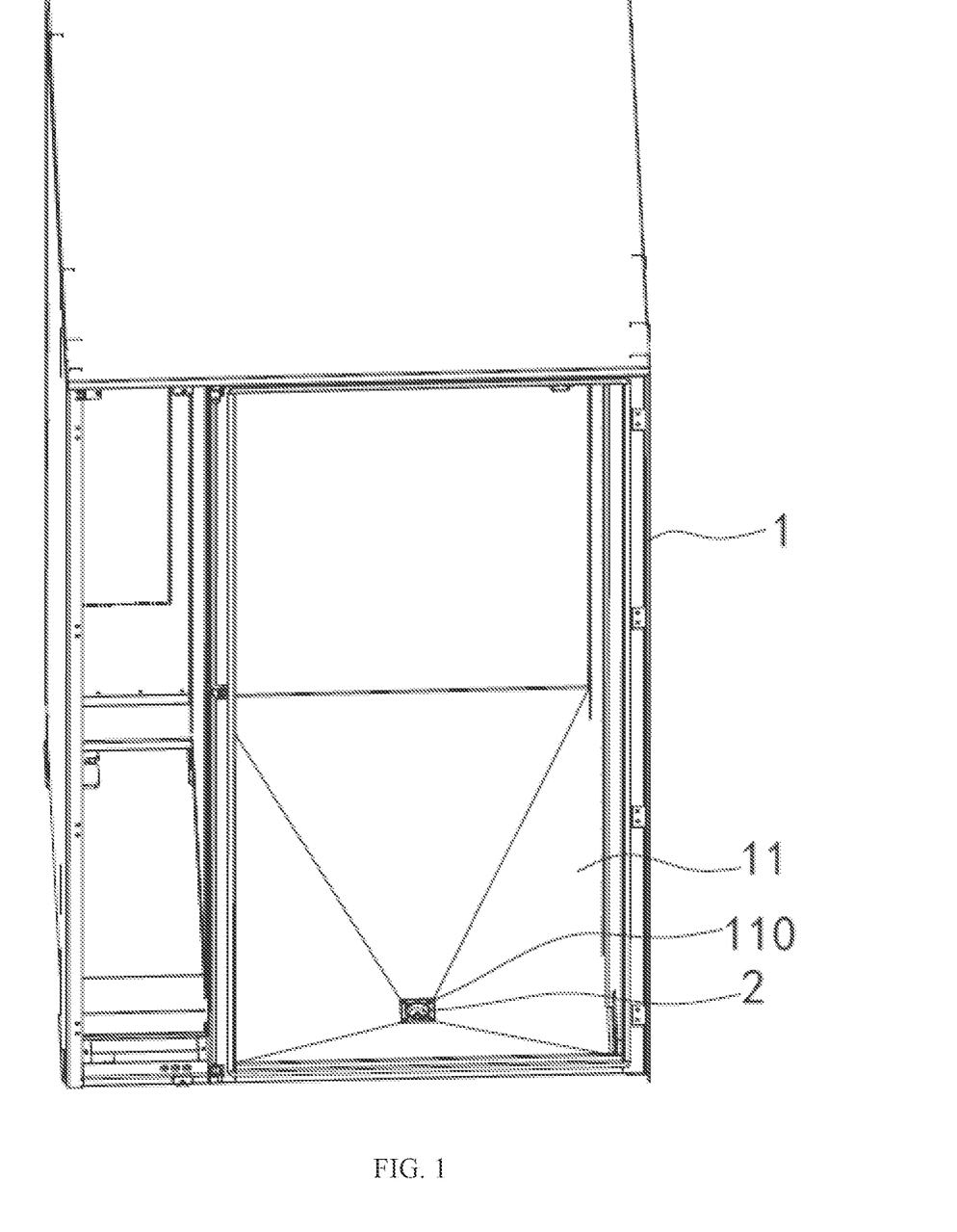
FIG. 1 is a schematic diagram of an internal structure of a battery cabinet according to an embodiment.
Figure 2:
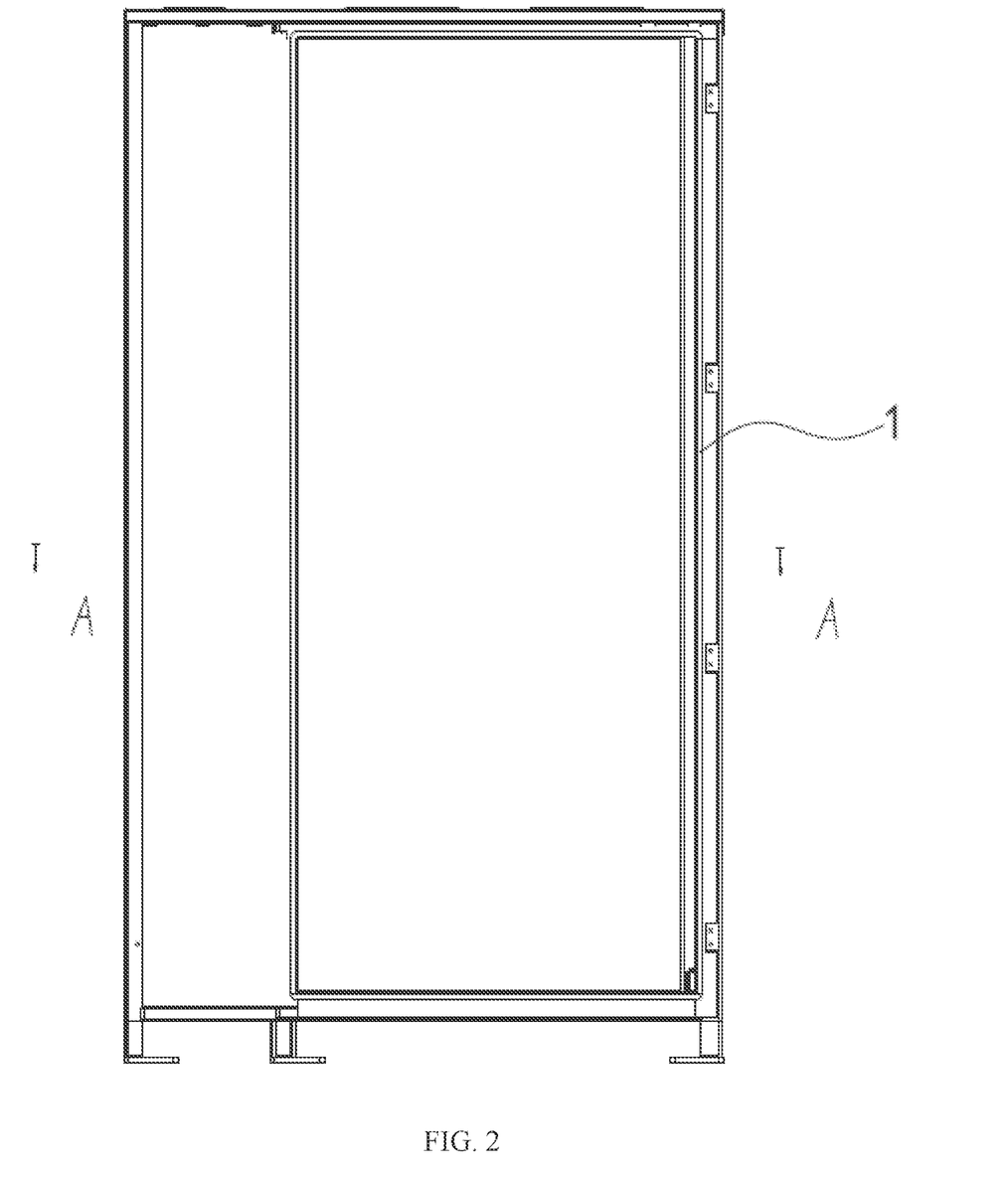
FIG. 2 is a side view of a battery cabinet according to an embodiment.

As shown in FIG. 1, the battery cabinet includes the cabinet body 1 and the drain assembly 2. The drain assembly 2 is disposed in the drain outlet at the bottom of the cabinet body 1, and the drain assembly 2 is configured to drain water accumulated in the cabinet body 1 to the outside of the cabinet body 1. As shown in FIG. 1 and FIG. 2, the cabinet body 1 has a space for arranging battery cells. The cabinet body 1 may be a rectangular cabinet body. The cabinet body 1 may include a metal frame and a bottom plate 11, a top plate, and a plurality of side plates that cover surfaces of the metal frame. The bottom plate 11, the top plate, and the plurality of side plates may be fixedly connected to the metal frame by welding, rivets, bolts, or the like, and the bottom plate 11 may be hermetically connected to the side plates by welding. Specifically, the drain assembly 2 is disposed on the bottom plate 11. Condensed water is produced during use of the battery cabinet, and the produced condensed water is deposited on the bottom plate 11. The drain assembly 2 disposed on the bottom plate 11 can drain the accumulated water to the outside of cabinet body 1.

Figure 3:
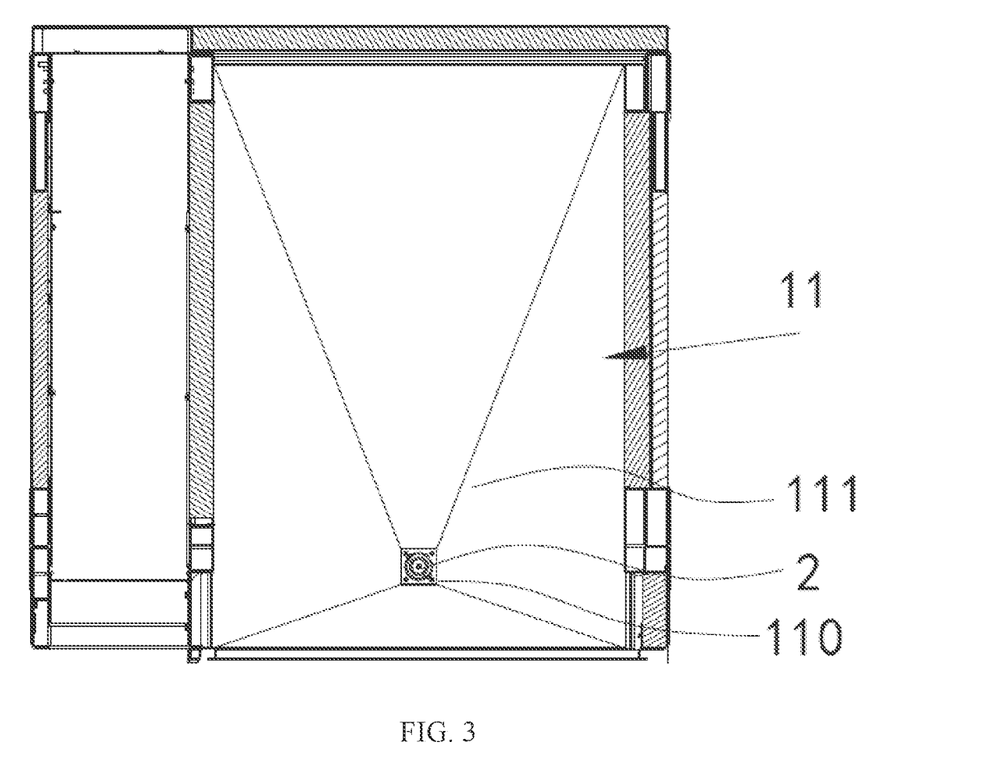
FIG. 3 is a schematic diagram of a cross section along A-A in FIG. 2.

As shown in FIG. 1 and FIG. 3, the bottom plate 11 is provided with the drain outlet 110 in the middle, and the drain assembly 2 is disposed in the drain outlet 110. The drain outlet 110 being disposed in the middle of the bottom plate 11 is conductive to collecting water accumulated on the bottom plate 11. In order to allow the water accumulated on the bottom plate 11 to flow to the drain assembly 2 more smoothly for draining, a conical diverting structure 111 is provided around the drain outlet 110 on the bottom plate 11. The conical diverting structure 111 is a structure in which the middle is lower than the periphery. To be specific, the drain outlet 110 is disposed in the middle of the conical diverting structure 111, and in a direction along the periphery of the conical diverting structure 111 toward the middle of the conical diverting structure 111, the conical diverting structure 111 has a decreasing height, so that water is diverted to the drain outlet 110. The conical diverting structure 111 is similar to a funnel-shaped structure. Four sides of the bottom plate 11 are inclined to the middle to form inclined planes, so that the drain outlet 110 in the middle of the bottom plate 11 is located at the lowest position. Water accumulated on the bottom plate 11 will be gathered to the lower middle along the inclined planes of the conical diverting structure 111 under the action of gravity, so as to flow into the drain outlet 110 and be drained to the outside of the cabinet body 1 through the drain assembly 2.

Figure 4:
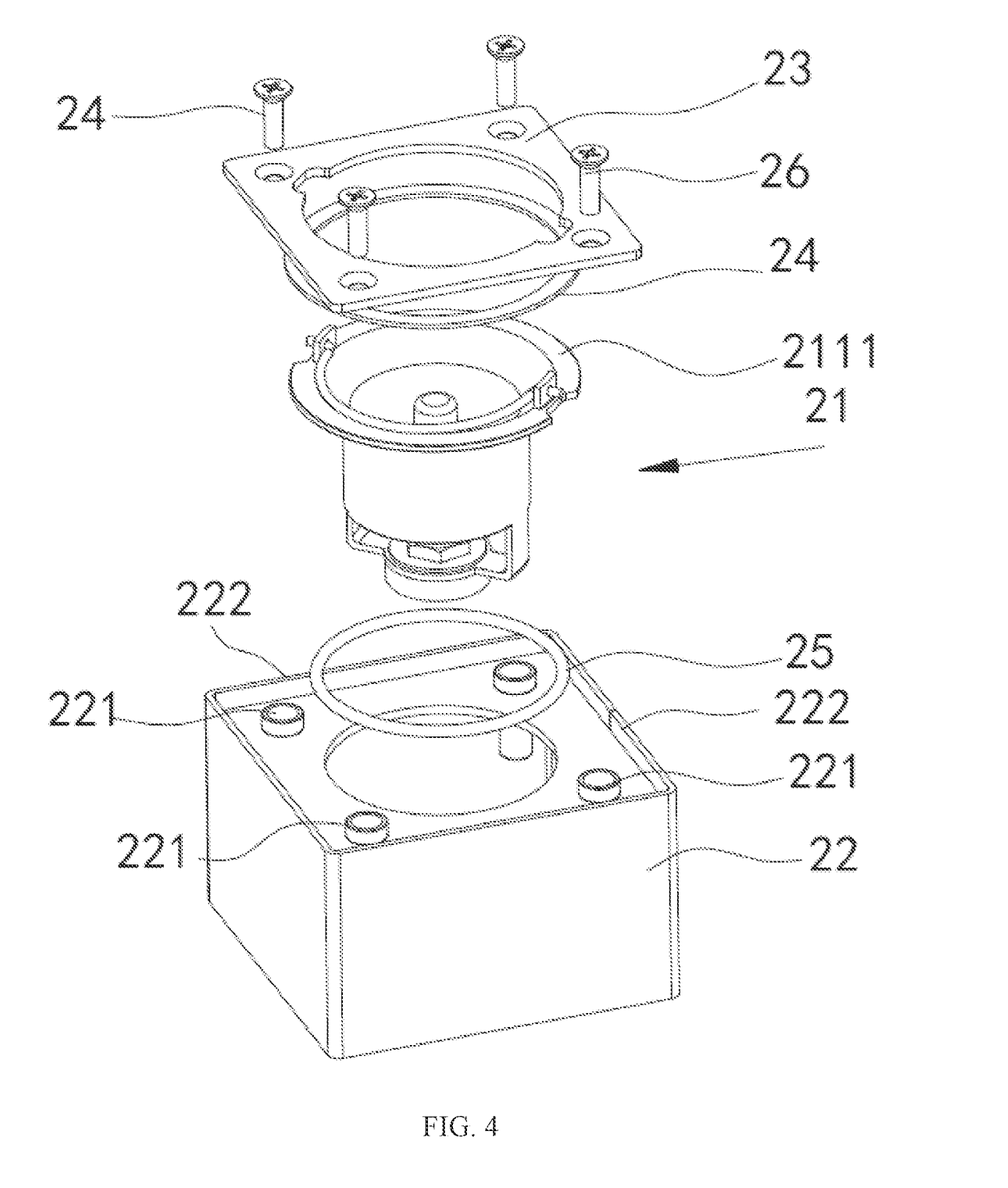
FIG. 4 is an exploded view of a drain assembly according to an embodiment.
Figure 5:
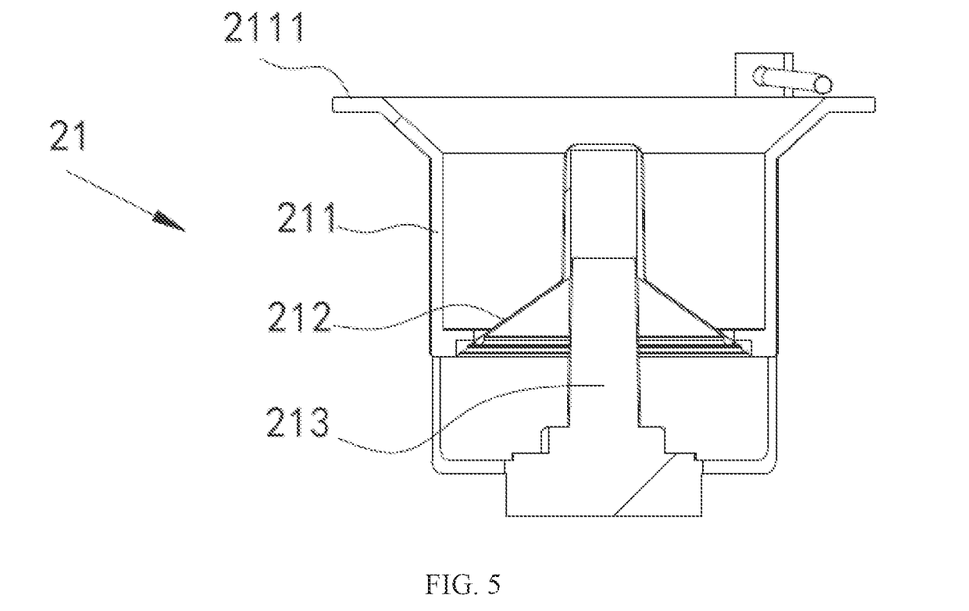
FIG. 5 is schematic diagram of an internal structure of a drain valve in a closed state according to an embodiment.
Figure 6:
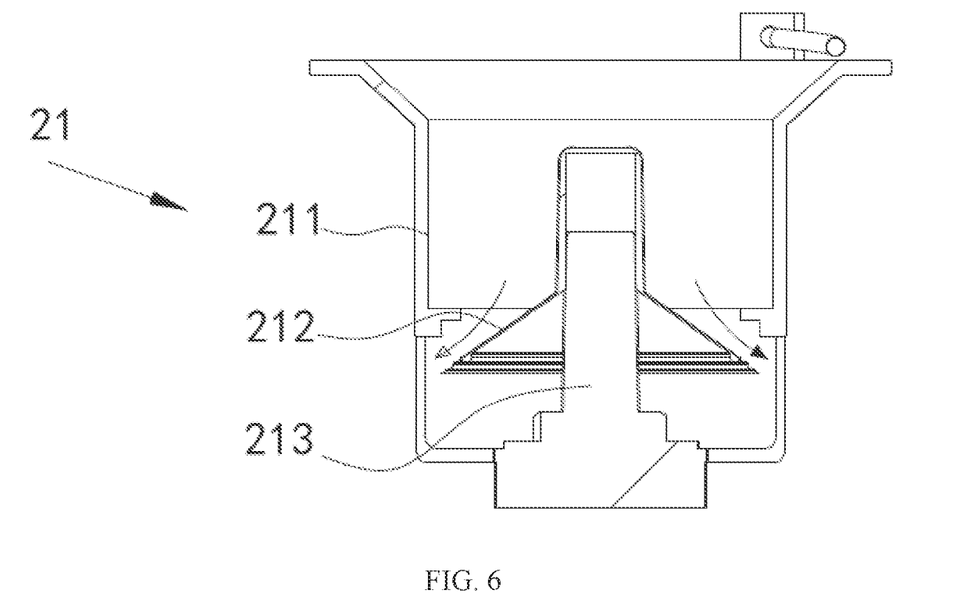
FIG. 6 is a schematic diagram of an internal structure of a drain valve in an open state according to an embodiment.

As shown in FIG. 4, FIG. 5, and FIG. 6, the drain assembly 2 includes a drain valve 21, a base 22, and a first seal ring 25. The base 22 is fixedly connected to the bottom of the cabinet body 1 by welding or fasteners such as bolts. The drain valve 21 communicates with the drain outlet 110 and is detachably mounted on the base 22. Specifically, the base 22 may be fixedly disposed on the frame of the cabinet body 1 by welding or bolts. The base 22 may be fixedly mounted on the frame during manufacturing of the cabinet body 1. The bottom of the drain valve 21 runs through a through hole and is detachably connected to the base 22. Specifically, the drain valve 21 may be detachably connected to the base 22 via bolts 26.

There may be a contact gap between the drain assembly 2 and the cabinet body 1 and between various parts of the drain assembly 2. In order to improve airtightness of connection between the drain assembly 2 and the cabinet body 1, as well as airtightness of connection between the various parts of the drain assembly 2, a seal ring is provided in the drain assembly 2 to enhance airtightness of connection of the drain assembly 2. Specifically, the drain valve 21 is hermetically connected to the upper surface of the base 22 via the first seal ring 25. That is, the first seal ring 25 is sandwiched between the drain valve 21 and the base 22. After the drain valve 21 is well assembled on the base 22, an upper surface of the first seal ring 25 is in close contact with the drain valve 21, and a lower surface of the first seal ring 25 is in close contact with the upper surface of the base 22, so that a gap between the drain valve 21 and the base 22 is sealed by the first seal ring 25. In this embodiment, the drain assembly 2 is provided with a cover plate 23, the first seal ring 25 is located between the cover plate 23 and the base 22, and the cover plate 23 and the base 22 are fixedly connected via the bolts 26. If the bolts 26 are fastened too tightly, a great pressure will be applied to the first seal ring 25. Because the seal ring is made of an elastic material such as rubber or silicone, the first seal ring 25 is easy to be crushed and loses its elasticity during assembling of the drain valve 21, resulting in poor sealing performance. In this embodiment, to prevent the first seal ring 25 from being crushed during assembling, the first boss 221 is provided on the upper surface of the base 22. The first boss 221 protrudes upward from the upper surface of the base 22. The first seal ring 25 is disposed adjacent to the first boss 221 on the upper surface of the base 22. The first boss 221 can play a role in limiting. When the drain valve 21 is assembled on the base 22 too tightly, the first boss 221 can come into contact with the drain valve 21 to limit the position of the drain valve 21, thereby preventing the first seal ring 25 from being crushed when the drain valve 21 is assembled on the base 22 too tightly.

Further, the first bosses 221 may be provided in plurality at the edge of the upper surface of the base 22. The first boss 221 is a columnar structure. The plurality of first bosses 221 may be uniformly distributed around the drain valve 21 in a circumferential direction of the drain valve 21. The first seal ring 25 is located inside the first bosses 221, that is, if the first bosses 221 are arranged around the drain valve 21, the first seal ring 25 can be located within a range surrounded by the first bosses 221. The first bosses 221 evenly distributed around can more evenly share the pressure applied to the first seal ring 25 after the bolts 26 are tightened, thereby preventing the first seal ring 25 from being crushed. The first boss 221 may be fixedly disposed on the upper surface of the base 22 by mechanical crimping. In other embodiments, the first boss 221 may be fixedly disposed on the upper surface of the base 22 by welding, bolting, or the like. In addition, the first boss 221 is not limited to the columnar structure shown in FIG. 4. In other embodiments, the first boss 221 may alternatively be an annular boss, an arc-shaped boss, or the like that protrudes upward on the upper surface of the base 22.

In an embodiment, the drain assembly 2 further includes a cover plate 23 and a second seal ring 24. The cover plate 23 abuts against a joint between the upper part of the drain valve 21 and the drain outlet 110. The second seal ring 24 is disposed on a lower surface of the cover plate 23. The top of the drain valve 21 overlaps with the edge of the drain outlet 110, and the cover plate 23 presses the top of the drain valve 21. Specifically, the upper part of the drain valve 21 runs through the drain outlet 110 and overlaps with an upper surface of the bottom plate 11. An overlapping portion between the drain valve 21 and the drain outlet 110 is hermetically connected by a sealant. The cover plate 23 may be made of a metal sheet such as stainless steel. A through hole for water to flow into the drain valve 21 is provided in the middle of the cover plate 23. The periphery of the cover plate 23 is opposite the overlapping portion between the drain valve 21 and the drain outlet 110, thereby covering the overlapping portion between the drain valve 21 and the drain outlet 110. The cover plate 23 presses against an upper surface of the bottom plate 11, thereby pressing against the overlapping portion between the drain valve 21 and the drain outlet 110. Therefore, the second seal ring 24 disposed between the cover plate 23 and the drain valve 21 can further optimize a waterproof effect. Moreover, the second seal ring 24 has a rectangular cross section, which can better fit with a connection gap between the cover plate 23 and the drain valve 21, thereby achieving a better waterproof effect.

As showy in FIG. 4, the base 22 is provided with threaded holes for mounting the cover plate 23, the cover plate 23 is provided with a plurality of through holes, the bolts 26 are correspondingly mounted in the through holes, the base 22 is provided with the threaded holes corresponding to the bolts 26, and the bolts 26 run through the through holes on the cover plate 23 and are connected to the threaded holes on the base 22, so that the cover plate 23 is pressed against the bottom plate 11. The second seal ring 24, the drain valve 21, and the first seal ring 25 of the drain assembly 2 are disposed in sequence between the cover plate 23 and the base 22. Therefore, when the cover plate 23 is pressed against the overlapping portion between the drain valve 21 and the drain outlet 110 via the bolts 26, the drain valve 21 is also pressed against the base 22 by a downward force from the cover plate 23. As shown in FIG. 4, in this embodiment, the threaded holes for mounting the cover plate 23 are provided on an upper end surface of each first boss 221; the through holes are respectively provided at four corners of the cover plate 23; and a tail end of each bolt 26 runs through the corresponding through hole on the cover plate 23 and is connected to the corresponding threaded hole, that is, the cover plate 23, the second seal ring 24, the drain valve 21, the first seal ring 25, and the base 22 are connected together via the bolts 26. Therefore, the drain valve 21, the first seal ring 25, and the second seal ring 24 are detached together with the cover plate 23, which facilitates mounting and maintenance of the drain assembly 2. In mounting or maintenance of the drain assembly 2, only the drain valve 21 needs to be mounted or unmounted separately, and there is no need to detach the entire drain assembly 2, which also facilitates replacement of the first seal ring 25 and the second seal ring 24.

In an embodiment, the cover plate 23, the second seal ring 24, the drain valve 21, the first seal ring 25, and the base 22 are connected together via the bolts 26, and height of the first boss 221 is smaller than the sum of edge thickness of a drain valve casing 211, original thickness of the first seal ring 25 (that is, thickness of the first seal ring 25 without being compressed), and original thickness of the second seal ring 24 (that is, thickness of the second seal ring 24 without being compressed). Therefore, when the bolts 26 are tightened, the cover plate 23 is pressed against the drain valve 21, the first seal ring 25 and the second seal ring 24 are pressed in a sealed state, protecting the first seal ring 25 and the second seal ring 24 from being crushed by the cover plate 23. Optionally, the first seal ring 25 has an O-shaped cross section, and the second seal ring 24 has a rectangular cross section. The first seal ring 25 is disposed between the drain valve 21 and the through hole on the base 22. The drain valve casing 211 is a cylindrical structure, and the through hole is a circle that fits with it. Therefore, the O-shaped first seal ring 25 can make the three fit more closely to achieve a better waterproof effect.

As shown in FIG. 4, in an embodiment, a second boss 222 is further disposed at the edge of the upper surface of the base 22. The first bosses 221 are located inside the second boss 222. The first seal ring 25 is located inside the first bosses 221. When the bolts 26 are tightened, the second boss 222 can provide an upward supporting force for the drain valve 21 and the cover plate 23, thereby improving airtightness between the edge of the drain outlet 110 and the cover plate 23.

As shown in FIG. 5 and FIG. 6, in an embodiment, the drain valve 21 is a magnetic drain valve. The drain valve 21 includes a valve spool assembly and the drain valve casing 211, the valve spool assembly is disposed in the drain valve casing 211, the drain valve casing 211 is a cylindrical structure, and the top of the cylindrical structure is provided with a folded-out flange. Specifically, in an embodiment, the drain valve casing 211 has a shape similar to a bell mouth or a funnel, the edge of an upper end of the drain valve casing 211 is connected to the drain outlet 110, and a draining channel is provided inside the drain valve casing 211. A valve spool 212 is disposed on the draining channel in the drain valve casing 211. The valve spool 212 has a shape that fits with the cross section of the draining channel. Specifically, the cross section of the valve spool 212 may be circular or the like. The valve spool 212 is movable inside the drain valve casing 211. When the valve spool 212 is moved to be in a first state, the valve spool 212 seals the draining channel (that is, seals the drain valve 21). When the valve spool 212 is moved to be in a second state, because the size of the valve spool 212 is smaller than the cross section of the draining channel at the same position, the valve spool 212 can no longer block accumulated water from passing through the draining channel, that is, the valve spool 212 opens the draining channel for draining (that is, opens the drain valve 21 for draining). Similarly, the drain valve 21 may alternatively be in other forms of structures, such as a spring-type structure, as long as it can implement the drain function.

In this embodiment, the valve spool 212 movably fits around the guide rod 213, the guide rod 213 is provided with a magnetic object, the magnetic object generates a magnetic force to drive the valve spool 212 to close the drain valve 21, and the drain valve 21 is opened when a downward force applied to the valve spool 212 is greater than a preset value. Specifically, the magnetic object is disposed on the drain valve 21, and generates a magnetic force acting on the valve spool 212, so that the valve spool 212 can stay in the first state of sealing the drain valve 21; and when the downward force on the valve spool 212 is greater than the preset value, the valve spool 212 stays in the second state of opening the drain valve 21 for draining. Specifically, the valve spool 212 is made of a metal material. The valve spool 212 can be moved up and down in the drain valve casing 211 of the drain valve 21. The magnetic object may be a magnet. The magnetic object is located above the valve spool 212, and the magnetic object has an upward magnetic force on the valve spool 212, so that the valve spool 212 stays in the first state of sealing the drain valve 21. When water accumulated on the valve spool 212 reaches a specified weight, the valve spool 212 is moved downward to be in the second state to open the drain valve 21, so as to drain the accumulated water out of the cabinet body 1. After the accumulated water is drained, the valve spool 212 is driven to move upward again under the action of the magnetic force to seal the drain valve 21. Similarly, in the case of an accident such as thermal runaway inside the cabinet body 1, after air pressure inside the cabinet body 1 reaches a specified value, the valve spool 212 is also automatically opened to relieve the pressure. Moreover, in existing draining methods, for example, using a spring assembly, a valve spool is moved via the spring, but the spring is prone to rusting, easily leading to problems such as valve spool draining or sealing failure. Different from such methods, in this embodiment, the magnetic object is used to control movements of the valve spool 212 of the drain valve 21, allowing for one-way draining, automatic closing after draining, as well as more reliable and accurate control of the movements of the valve spool 212.

In an embodiment, sealing treatment such as welding or sealant has been applied between the bottom plate 11, the side plates, and the top plate of the cabinet body 1, so that moisture can be prevented from entering the inside of the cabinet body 1 from joints between the bottom plate 11, the side plates, and the top plate. The drain assembly 2 can realize one-way draining from the inside of the cabinet body 1 to the outside, and moreover, the drain assembly 2 can be automatically closed after draining, thereby greatly ensuring the waterproof level of the battery cabinet. In addition, the water accumulated in the cabinet body 1 can be drained in one direction, and the first seal ring 25 and the second seal ring 24 can further improve the waterproofness and airtightness.

It should be noted that, although the foregoing embodiments have been described herein, it does not limit the patent protection scope of this application. Therefore, based on the innovative ideas of this application, changes and modifications to the embodiments described herein, or an equivalent structure or equivalent process alternation made by using the content of the specification and drawings of this application, or direct or indirect application of the foregoing technical solutions to another related technical field, shall fall within the patent protection scope of this application.

What is claimed is:
1. A battery cabinet, comprising:
   a cabinet body, wherein the cabinet body is configured to accommodate battery cells; and
   a drain assembly, wherein the drain assembly is disposed in a drain outlet at the bottom of the cabinet body, the drain assembly comprises a drain valve, a base, and a first seal ring, the drain valve communicates with the drain outlet and is detachably mounted on the base, the drain valve is hermetically connected to an upper surface of the base via the first seal ring, the base is fixedly connected to the bottom of the cabinet body, a first boss is disposed on the upper surface of the base, and the first boss is configured to protect the first seal ring.

2. The battery cabinet according to claim 1, wherein the first boss is provided in plurality on the upper surface of the base, and the plurality of first bosses are uniformly distributed around the drain valve in a circumferential direction of the drain valve.

3. The battery cabinet according to claim 2, wherein the drain valve comprises a valve spool and a guide rod; and
the valve spool movably fits around the guide rod, the guide rod is provided with a magnetic object, the magnetic object generates a magnetic force to drive the valve spool to close the drain valve, and the drain valve is opened when a downward force applied to the valve spool is greater than a preset value.

4. The battery cabinet according to claim 2, wherein the drain assembly further comprises a cover plate and a second seal ring; and
the top of the drain valve overlaps with the edge of the drain outlet, the cover plate abuts against the top of the drain valve, and the cover plate and the top of the drain valve are hermetically connected via the second seal ring.

5. The battery cabinet according to claim 2, wherein a second boss is further disposed at the edge of the upper surface of the base, the first bosses are arranged around the drain valve, and the first seal ring is located within an area surrounded by the first bosses.

6. The battery cabinet according to claim 2, wherein the cabinet body comprises a bottom plate and side plates, and the bottom plate is located at the bottom of the cabinet body; and
the bottom plate is provided with the drain outlet, the bottom plate further has a conical diverting structure, the drain outlet is disposed in the middle of the conical diverting structure, and in a direction along the periphery of the conical diverting structure toward the middle of the conical diverting structure, the conical diverting structure has a decreasing height, so that water is diverted to the drain outlet.

7. The battery cabinet according to claim 1, wherein the drain assembly further comprises a cover plate and a second seal ring; and
the top of the drain valve overlaps with the edge of the drain outlet, the cover plate abuts against the top of the drain valve, and the cover plate and the top of the drain valve are hermetically connected via the second seal ring.

8. The battery cabinet according to claim 7, wherein the drain valve comprises a valve spool assembly and a drain valve casing, the valve spool assembly is disposed in the drain valve casing, the drain valve casing is a cylindrical structure, the top of the cylindrical structure is provided with a folded-out flange, and the flange overlaps with the edge of the drain outlet.

9. The battery cabinet according to claim 8, wherein height of the first boss is less than the sum of thickness of the flange, original thickness of the first seal ring, and original thickness of the second seal ring.

10. The battery cabinet according to claim 9, wherein the drain valve and the base are detachably connected via a bolt; and
an upper end surface of the first boss is provided with a threaded hole that fits with the bolt, and a tail end of the bolt runs through the cover plate and is connected to the threaded hole, so that the cover plate, the second seal ring, the drain valve, the first seal ring, and the base are connected.

11. The battery cabinet according to claim 8, wherein the drain valve and the base are detachably connected via a bolt; and
an upper end surface of the first boss is provided with a threaded hole that fits with the bolt, and a tail end of the bolt runs through the cover plate and is connected to the threaded hole, so that the cover plate, the second seal ring, the drain valve, the first seal ring, and the base are connected.

12. The battery cabinet according to claim 8, wherein the first seal ring has an O-shaped cross section, and the second seal ring has a rectangular cross section.

13. The battery cabinet according to claim 7, wherein the drain valve and the base are detachably connected via a bolt; and
an upper end surface of the first boss is provided with a threaded hole that fits with the bolt, and a tail end of the bolt runs through the cover plate and is connected to the threaded hole, so that the cover plate, the second seal ring, the drain valve, the first seal ring, and the base are connected.

14. The battery cabinet according to claim 7, wherein the first seal ring has an O-shaped cross section, and the second seal ring has a rectangular cross section.

15. The battery cabinet according to claim 7, wherein a second boss is further disposed at the edge of the upper surface of the base, the first bosses are arranged around the drain valve, and the first seal ring is located within an area surrounded by the first bosses.

16. The battery cabinet according to claim 7, wherein the cabinet body comprises a bottom plate and side plates, and the bottom plate is located at the bottom of the cabinet body; and
the bottom plate is provided with the drain outlet, the bottom plate further has a conical diverting structure, the drain outlet is disposed in the middle of the conical diverting structure, and in a direction along the periphery of the conical diverting structure toward the middle of the conical diverting structure, the conical diverting structure has a decreasing height, so that water is diverted to the drain outlet.

17. The battery cabinet according to claim 7, wherein the drain valve comprises a valve spool and a guide rod; and
the valve spool movably fits around the guide rod, the guide rod is provided with a magnetic object, the magnetic object generates a magnetic force to drive the valve spool to close the drain valve, and the drain valve is opened when a downward force applied to the valve spool is greater than a preset value.

18. The battery cabinet according to claim 1, wherein a second boss is further disposed at the edge of the upper surface of the base, the first bosses are arranged around the drain valve, and the first seal ring is located within an area surrounded by the first bosses.

19. The battery cabinet according to claim 1, wherein the cabinet body comprises a bottom plate and side plates, and the bottom plate is located at the bottom of the cabinet body; and the bottom plate is provided with the drain outlet, the bottom plate further has a conical diverting structure, the drain outlet is disposed in the middle of the conical diverting structure, and in a direction along the periphery of the conical diverting structure toward the middle of the conical diverting structure, the conical diverting structure has a decreasing height, so that water is diverted to the drain outlet.

20. The battery cabinet according to claim 1, wherein the drain valve comprises a valve spool and a guide rod; and the valve spool movably fits around the guide rod, the guide rod is provided with a magnetic object, the magnetic object generates a magnetic force to drive the valve spool to close the drain valve, and the drain valve is opened when a downward force applied to the valve spool is greater than a preset value.

* * * * *